Sept. 1, 1925.

J. REECE ET AL 1,551,693

MECHANICAL POWER TRANSMISSION

Filed Feb. 21, 1923   3 Sheets-Sheet 3

Patented Sept. 1, 1925.

1,551,693

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

MECHANICAL-POWER TRANSMISSION.

Application filed February 21, 1923. Serial No. 620,466.

*To all whom it may concern:*

Be it known that we, JOHN REECE and FRANKLIN A. REECE, citizens of the United States, residing at Boston and Brookline, respectively, in the counties of Suffolk and Norfolk and State of Massachusetts, have invented certain new and useful Improvements in Mechanical-Power Transmission, of which the following is a specification, reference being had therein to the accompanying drawing.

This invention relates to mechanical power transmission and involves a novel method and apparatus for transmission of mechanical power, adapted to use in various situations and for various purposes where the speed ratio is required to be varied or adjusted, for example, as a part of the transmission of motor vehicles, or any analogous use where the load is variable and it is desired to alter the speed ratio or torque ratio to correspond.

The invention is herein shown applied to the motor vehicle type of transmission, especially to a motor vehicle driven by internal combustion engine through a fly wheel, the engine itself controlled by throttle. As is well known such engines do not generate power efficiently except at their higher speeds and while a given engine might be run, for example, as low as 150 R. P. M., or as high as ten times that rate or more, this would not be sufficient for the purposes of varying the speed or the torque to meet practical conditions. The main object of the present invention is to afford a successful mechanism to meet these requirements, and especially one which will be automatic, for a given throttle adjustment, so that as conditions of load may change the mechanism will itself afford different ratios of speed, accompanied by inverse ratios of torque, without the need of manual attention, or engaging or disengaging of mechanism, or shifting of gears, or the like.

A specific object is to utilize in a practical manner the action of centrifugal force as an element in the self-adjusting transmission of power, by means of a mass or masses carried around with the driver, that is to say the engine shaft or fly wheel, and taking part in the transmission. The use of centrifugally operating masses has heretofore been suggested, for example in Reece Patent 1,461,556 issued July 10, 1923. The mass is movably arranged on the driving parts so that it can be moved nearer to the axis thereof, opposed by its centrifugal force, which force therefore is constantly present as an actively pulling force and of substantial strength, indeed this force increasing as the square of the driving speed, being extremely powerful with the higher speeds. In combination with such mass or masses are embodied gears or other connections extending to the driven shaft and of such nature that whenever there is a difference in rotary speed between the driving and driven parts, this constituting a relative rotation, the driven shaft turning slower than the driving, the mass is compelled to move inward toward the axis of rotation. The resulting action is, that as the driven shaft load resists rotation with a certain force or drag, thus tending to draw the centrifugal mass inwardly, the centrifugal force of the mass offers continual resistance to the inward pulling and therefore to the drag on the driven shaft, and in this manner the centrifugal force operates literally to pull the driven shaft forward, delivering torque, derived from the power of the driving shaft, fly wheel and engine. This existing constant centrifugal pull therefore constitutes a vital though invisible transmitting link or connection from the driving to the driven parts; it is non-positive and resilient in action, giving a forcible and almost intelligent self-adjusting transmission of torque. It effects a pull or rotation upon the driven shaft of as high a speed as the available power warrants, but no faster, considering the load to be overcome. It yields to excessive load but merely to the extent of adjusting the speed ratio so that the power is able to overcome the load; the action being in a sense ideal as it is wholly self-acting without requiring coupling, uncoupling or other manual attention. As each mass is preferably a permanent part of the mechanism its inward movement will be succeeded, after it has reached its extreme position, by a return or outward movement, a separate phase of action, the mass thereby returning to a point where it is available for further transmitting action. Whenever the load is not too great for the driven shaft to be driven at the full speed of the driving shaft there will be no substantial inward yield of the mass, and the centrifugal force under theses circumstances, operates to hold the mass at an intermediate position, involving no internal movement of the mechanism, the forces being balanced, and the entire mechanism rotating substantially as a rigid unity. While the present invention and the prior patent possess these described qualities in common, the prior embodiment possesses certain disadvantages which it is an object of the present invention to overcome. For example, in the said patent each centrifugal mass was so connected that in its return or outward phase of movement the tendency of centrifugal force was to rotate the driven parts reversely, cancelling the previous driving effect, and requiring a special expedient, consisting of a device in the nature of a pawl and ratchet, to permit forward and prevent reverse rotation of the driven shaft, with a transmitting spring introduced to steady the intermittent impulses; which features, the pawl and ratchet and transmitting spring, are dispensed with in the present invention.

Other objects and advantages of the present invention will be made clear in the hereinafter following description of one form or embodiment thereof, or will be manifest to those skilled in the art. To the attainment of the objects and advantages mentioned, the present invention consists in the novel transmission of mechanical power, and the noval features of combination, arrangement, mechanism, design, detail, operation and method herein described or claimed.

A feature of the present invention is that the mass or mass portions are not fixed on their carriers or gears, but are free in the sense that while the carrier may force the mass inward against centrifugal force, the mass thereafter cannot in its return movement or outward phase apply its centrifugal force reversely to the carrier. The carrier discharges it and it reaches peripheral position without interaction with the carrier. For example loose weights, or flowing weights, such as portions of liquid may be the masses, these passing through a circuit, in the form of a weight train, the carrier forcing them inward and then discharging them to return outwardly.

In the accompanying drawings Figure 1, in its upper half, is substantially a central longitudinal vertical section view of one form or embodiment of a transmission apparatus embodying the principles of the present invention, the control handle shown so adjusted that the action will result in what may be considered forward drive of the driven shaft; the lower half of this figure being a section on a slanting line; the two section lines being indicated at 1—1 on Fig. 2.

Figure 1:
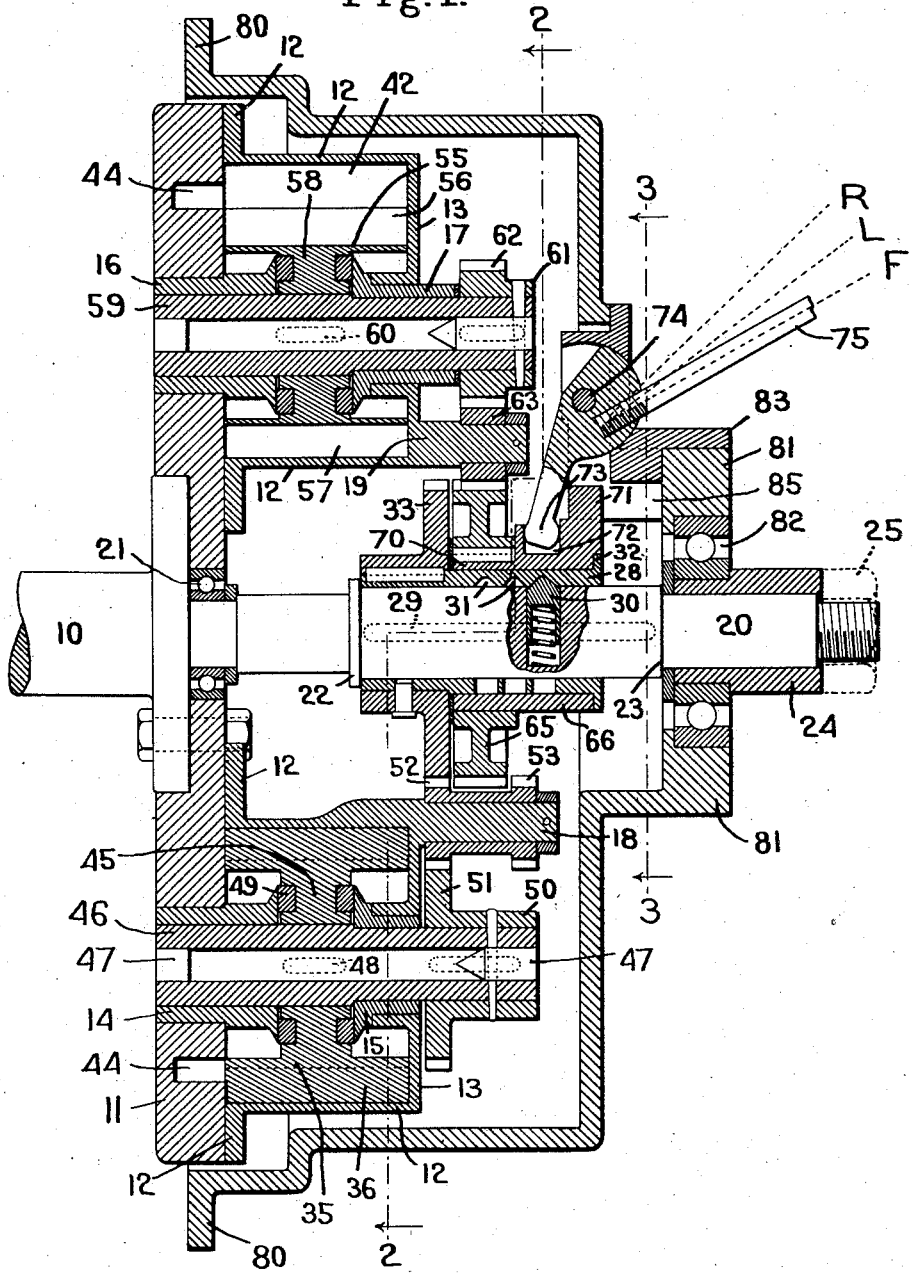

A convenient method of description is first to enumerate substantially all of the "driving" parts. An internal combustion engine is represented by its shaft 10, and attached to this shaft is a wheel, disk or support 11 which, with the mechanism that rotates with it, may be considered as the fly wheel, giving the steadying effect of the fly wheel customarily used with such engines.

Preferably the apparatus comprises more than one of the centrifugal mechanisms, and I have herein shown two although obviously three or more could be used. Each mechanism is contained in or mounted on a casing 12, this being a hollow shell bolted to the fly wheel or disk 11 as shown, its walls serving as confining means for the flowing or liquid centrifugal masses to be described. In addition to the main or peripheral wall of each casing 12 it is shown as having an end wall 13, of a flat shape, facing the disk 11.

Since it is preferred that the centrifugal masses be moved inwardly with a circular or planetating movement it is necessary to provide an axle for the planetating parts. Furthermore, the present embodiment discloses, in each centrifugal mechanism, two planetating wheels or carriers, the main carrier, by which the masses are forced centripetally and a second or return carrier by which the masses are guided in their outward movement after discharge from the main carrier; so that each centrifugal mechanism involves two axles, one for each planetating carrier. The axle for the main carrier 35 is shown as consisting of bushing 14 projecting rigidly inwardly from the fly wheel disk 11, and an opposing bushing 15 similarly projecting inwardly from the opposite or casing wall 13. The two bushings taken together are in the nature of a hollow bearing with the carrier shaft inside. Similarly the return carrier 55 is mounted for planetating movement upon bushings 16 and 17 corresponding with bushings 14 and 15. To complete the description of the parts rotating with the engine shaft two studs 18 and 19 should be mentioned, provided on each of the casings 12, extending toward the right, serving to support certain pinions, to be described.

The driven parts comprise primarily the driven shaft 20, and by the term shaft is to be understood a rotatable member of any nature. The driven shaft is preferably in axial alinement with the driver or fly wheel, although there are possible ways in which it could be located differently. At the left end of the driven shaft 20 is a bearing 21 between the shaft and the fly wheel. At an interior point the shaft has a collar 22 formed upon or attached to it, and further to the right is shown a shoulder 23, these bearing against the parts to the right of them. The driven shaft 20 may be considered as having connections extending further to the right and eventually to the wheels of a vehicle, and a portion 24 of a universal joint is indicated, this being part of the flexible rearward connections. A nut 25 confines the part 24 in place.

Certain parts, having to do with the shift between forward, reverse and locked condition, are arranged slidingly on the driven shaft 20 and rotating with it. These include a sleeve 28 in engagement with the shaft by key 29. A spring pressed pin 30 is shown fitted within the shaft and having a rounded nose adapted to engage in one of the three notches 31 formed in the interior of the sliding sleeve 28, yieldingly holding the sleeve in any adjustment. The sleeve has a shoulder 32 to confine certain rotary parts, and it has keyed to it a central gear 33 through which power is transmitted to the driven shaft.

The general principles of the centrifugal connection intermediate the driving and driven members have been indicated. It may take different forms, that which is shown serving to illustrate the principles. It has been stated that the mass or masses or succession or stream of masses which give the vital action to the centrifugal mechanism is moved toward the axis of the system on a carrier or carriers; and while the carriers might take different forms, in fact any form that will serve to compel the masses to travel inward against centrifugal force, I believe the simplest form of carrier to be a planetating member, that is, a rotary disk or wheel mounted eccentrically on the driving member so as to be carried bodily around while subject to rotation on its axis. Each carrier or planetating disk being itself preferably a balanced member is free from the effect of centrifugal force, but owing to its reception of the mass or succession of masses, by means of its containers or pockets or other receiving means, it is enabled to take part in the hereinbefore described action whereby centrifugal force is made use of in the transmission of the rotary energy from the driving to the driven parts, the carrier discharging the successive masses near their extreme inward position, so that the centrifugal pressure will always be at one side only of the carrier, and therefore continuously unbalanced, resulting in continuous centrifugal stress and transmission. The purpose of the second or return carrier is to convey the masses smoothly and without heat or injury to an outward point where they are redelivered to the first or main carrier, the centrifugal force during this second or outward phase being utilized, in connection with a stationary member, upon which thrust may be received, so as to cause the energy to be delivered to the driving parts, namely by the forward thrust caused upon the fly wheel. Each weight may be said to pass through a continuous circuit or cycle, acting on the main carrier in the first or inward phase, opposed by centrifugal force, and upon the return carrier in the second or outward phase, assisted by centrifugal force; this cycle and circulation of masses, however, ceasing whenever the driven load is sufficiently light to permit equal speeds or unity ratio between the driving and driven parts.

Now will be described the main carrier or planetating pocket wheel 35 and its fittings and connections, the second or return carrier or wheel 55 to be separately described later. The carrier 35 is shown as a planetating wheel having vanes 36 forming pockets 37, these constituting convenient receiving means for the centrifugal weights, which in this case are shown as portions of a body of liquid 38, preferably mercury on account of its density. The pocket wheel 35 is enclosed circumferentially within the casing walls 12 and laterally between the fly wheel 11 and the casing wall 13. The vanes form a fairly close peripheral fit with a portion of the curved wall 12, which is arranged to confine the mercury within the pockets as each pocket moves from its most outward position around to its most inward position, the rotation being clockwise in Fig. 2. The pockets in their return movement do not follow the casing, the wall 12 of which curves away, thence extending around the return carrier wheel 55, the arrangement being such that that the mercury in the pockets 37, discharged from the main carrier, naturally passes across and into the pockets of the return carrier. Within the casing is arranged an abutment 39 having a concave surface 40 facing the main carrier, and a second concave surface 41 facing the return carrier. The surface 40 is spaced somewhat from the vanes 36 so that any mercury remaining in the pockets can travel outwardly without centrifugal effect upon the carrier wheel 35. The abutment 39 does not extend across the casing, and a space 42 is left, constituting a passage for the discharge of mercury from the main carrier and is transferred to the carrier 55. Within the casing and outward of the abutment 39 is a space or recess 43 which, in operation, constitutes a pool or basin adapted to hold the body of mercury 38, which, owing to the high centrifugal force, will normally remain in about the condition illustrated, so that it can supply masses to the carrier 35, which takes up portions of the liquid and carries them inward to deliver them to the return carrier, which later conducts them outwardly, restoring them to the pool or body of mercury. To prevent depletion of the mercury supply to an objectionable extent there is shown a supplemental space or reservoir 44 cut as a groove in the fly wheel 11. When a large quantity of mercury is being planetated, or when the supply runs short, this reservoir 45 yields up mercury to the main reservoir or pool 43.

The planetating carrier 35 has a web 45 extending inwardly to its hollow shaft 46. The shaft may be arranged to contain oil and is stopped by plugs 47. A key 48 connects the carrier and shaft. The shaft revolves inside the bushings 14 and 15 as bearings, and gaskets 49 may be arranged between the web 45 and the bushings.

It remains to describe the mode of connection between the carrier shaft 46 and the driven shaft. On the right end of the shaft 46 is the hub 50 of a planet gear 51. The gear and carrier wheel therefore are rigidly united. The gear 51 engages with the pinion 52 mounted loosely on the stud 18. The pinion 52 has a toothed extension or second pinion 53 towards the right. The pinion 52 engages directly with the central gear 33, which is keyed to rotate with the driven shaft. By different connections it will be seen that when the driven shaft is stationary or turns more slowly than the driving parts the central gear, acting through the intermediate pinion, compels the planetation of gear 51 and carrier 35. The centrifugal force of the flowing weights opposes this action, thereby transmitting torque and tending to drive forwardly the driven shaft.

Figure 2:
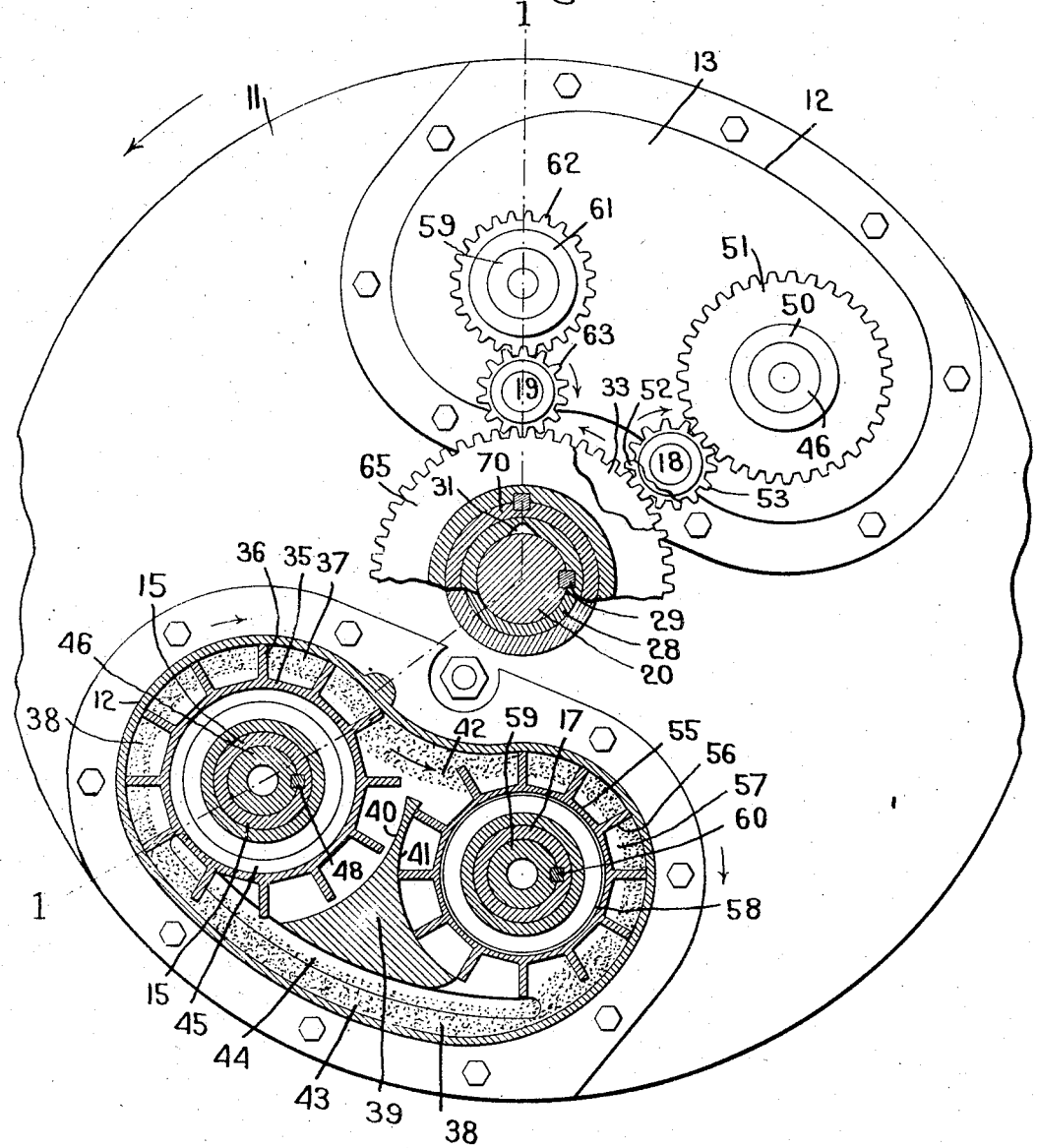
Figure 2 is a transverse section taken on the broken line 2—2 of Fig. 1 with, however, certain parts, including the fixed outer casing, omitted for clearness.

A feature of some importance is the introduction, between the central gear and the planetating gear, of the pinion 52, and these remarks apply also to the pinion 63, later described. The effect of this is to cause the carrier to rotate on its axis in the opposite direction to the rotation it would have if the central and planetating gears directly engage, as in said prior application. Other means of reversing the rotation could be employed, for example a sprocket chain around the gears 51 and 33 instead of the pinion between them. In Fig. 2 the fly wheel is shown rotating counterclockwise while the carrier rotates clockwise and this new arrangement gives greatly improved transmitting results. This feature however is not herein claimed per se, but only in the particular association herein illustrated, as the feature is the sole invention of John Reece and claimed in copending application Serial Number 672,508, filed November 3, 1923.

The second carrier or return pocket wheel 55, like the carrier 35, is provided with vanes 56 forming pockets 57 for the mercury 38. The two carriers are mounted not on the same shaft or axis, but on parallel shafts, as shown, this specific arrangement being sometimes preferable. Fig. 1 in the lower part shows one of the main carriers 35 and in the upper one of the return carriers 55. The return carrier 55 is formed with a web 58 extending inwardly to its hollow shaft 59, the two being attached together by a key 60. Outside the casing the shaft 59 carries the hub 61 of a planet gear 62. This as shown in Fig. 2 is considerably smaller than the corresponding planet gear 51 of the main carrier. The planet gear 62 engages a pinion 63 on the stud 19 and this pinion engages upon a central gear 65 which is held stationary. The planetation of the gear 62 and the return carrier therefore is continuous and is uniform so long as the driver speed is uniform.

Figure 3:
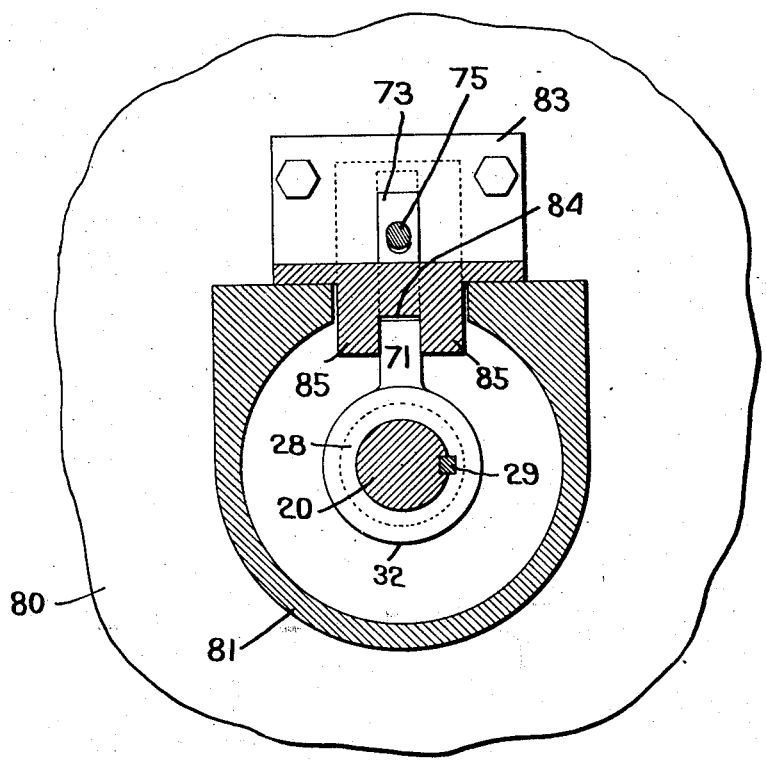
Figure 3 is a transverse section on the line 3—3 of Fig. 1.

This completes the description of the planetating systems. The central gear 65 is rendered stationary, that is non-rotatable, by reason of being secured to a sleeve 70, this sleeve loosely surrounding the sliding sleeve 28, so that the shifting or sliding action serves to move the stationary gear 65 axially. The non-rotating sleeve 70 is confined between the members 32 and 33 of the rotating sleeve 28. The non-rotating sleeve 70 has an upstanding tongue 71, see Fig. 3, employed for rendering the sleeve non-rotating. The sleeve also has a groove 72 by which it is shifted through a finger 73, the finger being pivoted at 74 to a fixed part of the apparatus and having an exterior lever or handle 75, by which the shifting is effected. Fig. 1 indicates three positions of the hand lever, F for forward drive, L for locked position and R for reverse.

Surrounding the mechanism is a stationary housing 80 which at the right is shown as provided with a hub portion 81 and between this hub and the driven shaft is a bearing 82. Bolted to the housing 80 is a casting 83. This gives support to the pivot 74 of the reversing lever, and it also provided a slot 84 by means of two lugs 85 between which the upstanding tongue 71 engages to hold the sleeve 70 against rotation.

The parts are shown set in position for forward drive. The driven shaft central gear 33 engages the carrier 35 through the pinion 52 and planet gear 51. The stationary central gear 65 engages the return carrier 55 through the pinion 63 and planet gear 62. If now the control lever 75 be shifted to position L the sleeve 28 will be moved to the right until the pin 30 engages the central notch 31. When the gear 33 and the stationary central gear 65 are both engaged by pinion 63, this locks the entire system so that no planetating motion can be communicated to the main carrier, and so that no power will be transmitted to the driven shaft, and indeed so that the driven shaft is held against rotation. Another shift of the control lever to position R effects a reverse. The axial lengths of the different gears taking part in the shifting action are such that in the third position the stationary central gear 65 disengages the pinion 63. The driven shaft central gear 33 remains engaged with pinion 63 and thereby with the return carrier, while the stationary gear remains engaged with pinion 53 and thereby with the main carrier. The connections are reversed, the effect of centrifugal force is reversed, and the driven shaft will be rotated reversely. The planetating gear 62 being smaller than the gear 51, the driven speed during reverse will be substantially lower than when driven forward.

When adjusted for forward driving, the action of the mechanism may be explained as follows: If the driven shaft and the central gear carried by it are held against rotation, the planetating gear and the carrier attached to it will rotate upon their axes while bodily carried around with the driving parts. If the carrier were not engaged by masses or otherwise retarded, there would be free planetation without operative effect. Assuming now that the planetation of the carrier be retarded, namely, by the resistance of the centrifugal force acting upon the successive masses which are forced inwardly by the carrier, the tendency will be to drive forwardly the driven shaft. The centrifugal force referred to is that about the main axis of the apparatus and it will be very considerable when the fly wheel is rotating at high speed. For a given mass the centrifugal force increases as the square of the rotary speed. If there is a substantial load or resistance opposing the driven shaft, the latter will be started in rotation by the described centrifugal action as soon as it becomes sufficient, as the driving parts are speeded up, to resist the planetating rotation of the carrier. With ordinary loads, the present invention is able to deliver unitary speed ratio, that is, when the centrifugal force of the masses engaged with the carrier is sufficient to prevent planetating rotation, and thus sufficient to compel the centrifugal gear and the driven shaft to turn at full speed, these parts all going with the fly wheel substantially as though locked together, thus giving an exceedingly quiet and effective transmission at unit ratio, free from interior play of the mechanism.

When the driven shaft load is increased to a point too great to be thus driven at full speed under any given conditions, the speed ratio reduces and, temporarily, the fly wheel speed may become reduced to a point where the centrifugal force of the masses is insufficient to maintain unitary ratio. The relatively slower rotation of the driven shaft, or rather the difference in rotary speeds, is the factor which causes the carrier to planetate. The mass-train is then forced inwardly in a progressive manner by the carrier and discharged at the most inward point. The centrifugal force actively opposes this inward forcing action and, as already explained, this live force or pull is thus effectively applied to the forward effort on the driven shaft at the reduced speed, and the reduced work permits the driving shaft to speed up, which it will do to a substantial extent, thus maintaining the driving torque or effort. Further, the reduction of speed ratio by the described change of internal conditions, involving the planetating motions, will be accompanied by a proportionate increase of torque delivered to the driven shaft. The action adjusts itself so that for any given load or resistance on the driven shaft, the mechanism will operate to deliver the greatest possible speed to the driven shaft consistent with the delivery thereto of the necessary torque. A self-maintained balance is thus brought about wholly by the action of the device and without conscious attention of the operator, affording always the necessary torque for any given conditions and the greatest possible speed available with such torque; for example, when an automobile passes to a point of more difficult road conditions, it will automatically slow down to the most advantageous speed and at this speed will effectively overcome the conditions presented. It is to be understood, of course, that the operator may always supplement this automatic readjustment by means of the throttle, opening or closing it to give increase or decrease of torque or speed.

The successive masses, when moved inwardly by the main carier, are discharged at or near their most inward point of movement. Eventually the discharged masses or portions are received in the pool described. There could be a free passage from the discharge to the pool, but there is illustrated a second carrier or pocket wheel which receives the discharged masses and conducts them outwardly, during which action, constituting the second phase, the centrifugal force acts as described to deliver rotary energy back into the fly wheel or driving member. The two carriers are not at the same speed; in fact the main carrier is at varying speeds while the return carrier is fairly constant. While the individual mass portions act as described, passing through two phases in each cycle, the conditions in the two carriers are maintained continuously, so that the torque delivery and the restoration of power are continuous actions.

The present mechanism therefore produces steady continuous drive with increased torque and reduced speed, with the torque and speed adjusting themselves under conditions of varying load. The underlying principle is the movable carrier mounted eccentrically on the driving member, combined with the succession of masses, the carrier being actuated from the driven member so as to run the faster when the driven shaft runs the slower, and arranged to force the masses inwardly so that each mass may act through its centrifugal force to retard the carrier and thereby urge forwardly the driven shaft.

The connections therefore are of a yielding rather than a positive character. The utilization of centrifugal force gives a resilient connection which is both effective and free from irregular action. At low engine speeds the centrifugal force is negligible and thus by slowing down the engine we have the effect of throwing out the usual clutch, no clutch being needed. As the engine speed increases drive will take place when the transmitted torque exceeds the driven shaft load. Also a vehicle can be allowed to run down hill by merely slowing the engine sufficiently, and by again opening the throttle drive can be resumed, all without any disengagement or engagement. Further points of advantage and differentiation over practical transmissions in prevailing use could be pointed out, but the preceding description is believed to give a clear disclosure of the principles of this invention. Co-pending applications can be referred to for further particulars of operation and advantage.

It will thus be seen that we have described a power transmission method and apparatus embodying the principles and attaining the objects and advantages of the present invention. Since many matters of construction, arrangement, combination, design and detail may be variously modified without departing from the principles involved, it is not intended to limit the scope of the present invention except in so far as set forth in the appended claims.

What is claimed is:

1. Power transmission apparatus comprising in combination, the driving and driven members, a revoluble support turned by the driving member, a first carrier movably mounted on said support and having a connection from the driven member for actuating it, a centrifugal mass, means on said carrier to engage said mass and thrust it in opposition to its centrifugal force and to discharge it, and a second carrier movably mounted on said support at a point removed from the first carrier and in a position to receive the mass discharged from the first carrier and conduct the mass in its return movement.

2. Power transmission apparatus as in claim 1 and wherein the first carrier has its mass engaging means discharging exteriorly to the second carrier.

3. Power transmission apparatus as in claim 1 and wherein the two carriers are planetating carriers mounted on different axes.

4. Power transmission apparatus as in claim 1 and wherein means are provided to maintain a pool of flowing mass at an outward point, and the first carrier located to pick up a mass portion, carry it inward and discharge it, the second carrier located to receive the discharged mass conduct it outwardly and return it to the pool.

5. Power transmission apparatus as in claim 1 and wherein a plurality of masses cooperate with the carriers, each carrier having a train of holders to hold and carry a train of successive masses.

6. Power transmission apparatus as in claim 1 and wherein the first carrier is formed with a series of exterior pockets each adapted to receive a mass portion in an outward position, thrust it inwardly, and discharge it to the second carrier.

7. Power transmission apparatus comprising in combination the driving and driven members, a movable carrier revolved bodily by the driving member, and having a connection from the driven member for actuating it, and a centrifugal mass, said carrier having exterior holders to engage and carry a mass and discharge it exteriorly.

8. Power transmission apparatus as in claim 7 and wherein the mass is a body of flowing mass normally tending toward an outward position, whereby successive portions may be engaged, carried inwardly and discharged exteriorly by said carrier to be returned to the body of mass.

9. Power transmission apparatus comprising the driving and driven members, a revoluble support turned by the driving member, a centrifugal mass, a fixed guide on said support for guiding said mass inwardly, and a movable carrier operable to receive the mass exteriorly and thrust it inwardly guided by said guide, the carrier having connection from the driven member for actuating it whereby the centrifugal force in the mass opposing such actuation is transmitted to the driven member.

10. Power transmission apparatus as in claim 9 and wherein the guide is a curved wall and the carrier is a planet wheel with exterior vanes travelling along said wall from an outward to an inward point.

11. Power transmission apparatus as in claim 9 and wherein the guide is a curved wall and the carrier is a planet wheel with exterior vanes travelling along said wall from an outward to an inward point, to carry the mass inward and discharge it to return to the outward point.

12. Power transmission apparatus as in claim 1 and wherein are connections between the second carrier and the revoluble support to cause the centrifugal force in the mass to be applied to exert forward thrust upon the revoluble support.

13. Power transmission apparatus comprising in combination, driving and driven shafts, a support revolved by the driving shaft, a hollow casing fixed on said support, a mass-thrusting device enclosed in the casing, connections from the driven shaft to the device for actuating it, and a body of flowing mass maintained as a pool in the outer side of the casing, said device being arranged to enter the mass pool and separate out a mass portion, convey it inwardly and discharge it to return to the pool.

14. Power transmission apparatus comprising in combination the driving and driven members, a revoluble support turned by the driving member, a flowing mass, a hollow casing fixed on said support and enclosing said mass, and a movable device within the casing having connections by which it is actuated from the driven member to force mass portions in opposition to the centrifugal force thereof.

15. Power transmission apparatus as in claim 14 and wherein the casing contains also a second movable device, receiving the mass for its return movements and utilizing the centrifugal force therein.

16. Power transmission apparatus as in claim 1 and wherein is provided means for effecting a reversal of the rotation of the driven member at will.

17. Power transmission apparatus as in claim 1 and wherein is provided means for effecting a reversal of the rotation of the driven member at will and means for preventing any rotation of the driven member at will.

18. Power transmission apparatus comprising in combination driving and driven members, a movable carrier revolved bodily by the driving member and having connection from the driven member for actuating it, a centrifugal mass, said mass and carrier cooperating to oppose the force actuating the carrier to the centrifugal force in the mass, whereby the latter force is transmitted through said connection to the driven member, and means for at will shifting such connection to reverse the direction of the rotation of the driven member.

In testimony whereof, we have affixed our signatures hereto.

JOHN REECE.
FRANKLIN A. REECE.